F. MULLER.
CHUCK.
APPLICATION FILED JUNE 13, 1910. RENEWED NOV. 23, 1915.
1,187,920.
Patented June 20, 1916.
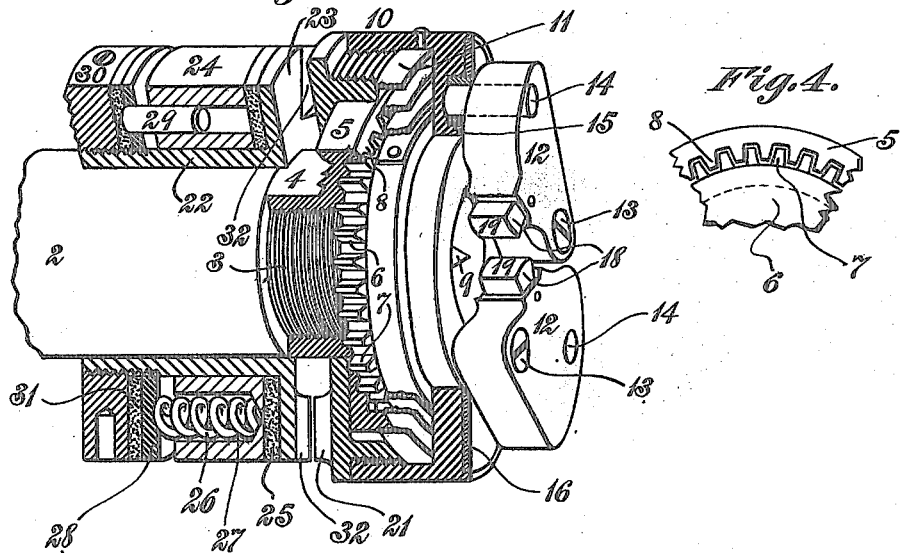
Witnesses:
Eof Nordstrom
Frank Srybal
Inventor:
Friederich Müller
By his Attorneys,
Sutherland & Anderson

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

CHUCK.

1,187,920.  Specification of Letters Patent.  Patented June 20, 1916.

Original application filed January 3, 1910, Serial No. 536,106. Divided and this application filed June 13, 1910, Serial No. 566,467. Renewed November 23, 1915. Serial No. 63,141.

*To all whom it may concern:*

Be it known that I, FRIEDERICH MÜLLER, a citizen of the United States, residing at Hartford, in the county of Hartford and State of Connecticut, have invented certain new and useful Improvements in Chucks, of which the following is a specification.

This invention relates to work-carriers, the object of the invention being to provide an effective device of this character having means for gripping and driving various kinds of work.

A work-carrier involving my invention can be used with advantage in many different connections, for illustration in conjunction with a lathe as shown in my copending application filed January 3, 1910, Serial No. 536,106 of which the present application is a division.

In the drawings accompanying and forming part of the present specification I have illustrated in detail one simple and convenient form of embodiment of the invention, which to enable those skilled in the art to practice said invention, will be set forth fully in the following description, while the novelty of the invention will be included in the claims succeeding said description. From the statement just made it will be understood that I do not restrict myself to the disclosure made by said drawings and description, for I may depart radically therefrom within the scope of my invention as expressed in said claims.

Referring to said drawings: Figure 1 is a sectional perspective view of a chuck comprising my invention and certain adjacent parts. Fig. 2 is a longitudinal, central sectional view of said chuck. Fig. 3 is a front elevation of the same. Fig. 4 is an elevation of parts of two of the chuck elements, and, Fig. 5 is a detail view of a portion of a protecting plate.

Like characters refer to like parts throughout the several figures.

I have shown my work-carrier in connection with the live spindle 2 of a lathe, the forward end of said spindle being reduced as at 3 and circumferentially threaded to receive the sleeve-like body portion 4 of the main member 5. It might be well to state at this point that the carrier comprises a driving and a driven member and the part 5 serves conveniently as such a driving member it rotating or turning with the spindle 2. The driven member is denoted by 6 being inclosed in the present case by said driving member 5. The driven member 6 which is approximately in the form of a ring preferably carries the jaw mechanism and has peripheral teeth 7 which coöperate with the internal teeth 8 on the driving member 5. There is a meshed relation between the two sets of teeth, and although it is a very free or loose one, it is sufficient to transfer power from said driving to said driven member. The annular driven member therefore floats being capable of radial movement in all directions with respect to the driving member, and owing to the novel mounting of said member, I can automatically compensate for any eccentricity of the blank or work, due to imperfections or other causes therein, which is to be centered between the center 9 on the live spindle 2 and the center on a tail spindle (not shown) owing to the fact that said driven member can move radially in any direction and thereby perfectly adapt itself to the character of the blank or equivalent part, and it is quite immaterial what means be provided for transferring power from the driving to the driven member, although that already described is quite advantageous.

The driving member 5 is shown surrounded by a two-part sectional barrel or casing 10, the sections of which may, as shown, be connected by a screw-thread joint; this barrel or casing 10 houses the driving and driven members 5 and 6 and is capable of turning relatively thereto. Between the front edge of the driving member 5 and the front wall of the barrel or casing 10 a coiled spring as 11 is disposed, one end of said spring being rigidly connected with the driven member 6 exteriorly thereof, while the other end of said spring is connected in like manner with the inner surface of said barrel or casing 10, said spring constituting, as will hereinafter appear, a convenient means for closing the jaws of the chuck.

The jaw mechanism may be mounted in any suitable manner and may comprise any desirable number of jaws, three of said jaws being shown and each being denoted by 12, said jaws being preferably connected with the driven member 6 as by being mounted for swinging movement eccentrically thereon, pivots 13 presenting a convenient means for eccentrically connecting the respective jaws and driven member. Each of the jaws 12 is shown provided with an inwardly extending stud or pin 14 fitting a cam groove 15 in the front face of the forward wall of the barrel or casing 10. The jaws 12 in the present case are mounted to swing closed toward the center of the chuck and to open away from said center, a point which is approximately coincident with the axis of the spindle 2. I say "approximately" as this point, as will be evident, may vary somewhat owing to the fact that the driven member 6 floats. The constant tendency of the coiled spring 11 is to move the barrel 10 in the direction of the arrow in Fig. 3 and thereby through the cam slots 15 or their walls which act on the studs 14, serving to swing the three jaws 12 inwardly to close the same. The barrel 10 normally rotates with the driven member 6, but it will be apparent that by arresting the motion of said barrel with said driven member, the jaws 12 will be opened and means are provided as will hereinafter appear, for accomplishing this result.

I interpose between the jaws 12 and the barrel 10 a plate 16 which extends across the joint between the barrel and driven member 6, thereby preventing chips and other foreign matter from entering the interior of the chuck from the front thereof, said plate or disk being fastened in some suitable manner to said driven member 6 and having arcuate slots 17 through which the respective studs or pins 14 extend, the arcs of said slots being struck from the centers of motion of the respective jaws 12.

The jaws 12 are provided at their operative or gripping portions with supplemental or auxiliary jaws 18 which are pivoted to the main jaws 12 and which have eccentric surfaces 19 for directly engaging the work so that in the case of a lathe, where the work is to be turned, these auxiliary jaws are automatically tightened upon the work; that is to say, the mere act of rotating the work or blank tends to tighten the auxiliary jaws thereon. Coiled springs 20 surround the pivots of the jaws 18 and normally hold said jaws 18 with their lowest points in position to initially engage the work or blank.

Upon the inner side of the barrel or casing 10 are two projections or lugs 21, and these projections or lugs present a convenient means to be engaged by a suitable intermittently-operable device for arresting the turning of the barrel 10 with the driven member 6, and when this occurs the jaws 12 through the intermediate parts will be opened. There are, of course, other ways in which the motion of the barrel with respect to the driven member might be arrested, but the said projections in connection with a coöperating member, which I will hereinafter describe, answer satisfactorily in this connection.

Loosely mounted on the forward portion of the spindle 2 is a band or sleeve 22 provided at its forward end with an annular flange 23. Encircling and slidable on said band is a ring 24 and between said ring 24 and flange 23 is a body 25 of suitable frictional material, such as leather, the ring 24, frictional material 25 and flange 23 being pressed together by one or more push springs 26 seated in sockets 27 in said ring 24 and bearing against the bottoms of the sockets and also against a disk 28 surrounding the band or sleeve 22. Said disk is provided with one or more guide pins 29 which fit bores in the ring 24 to prevent turning of said ring, as the same is moved back and forth on the band or sleeve 22. Non-rotatively fitted to said band or sleeve 22 is a collar 30 and between said collar and disk is a body 31 of frictional material. On the front face of the flange 23 are projections 32 coöperative with the projections 21. The two sets of projections are shown out of contact in Fig. 2, but it will be evident that when the projections 32 are moved into the path of the projections 21, the motion of the barrel 10 with the driven member 6 will be arrested when the projections 21 engage the projections 32, to effect the swinging open of the jaws 12. As a means for shifting the band or sleeve 22, the lever 33 may be utilized. I have not deemed it necessary to show the mounting of this lever and while it may be either operated by hand or automatically, it will, in the case of a lathe, be operated automatically. The lever 33 is connected with the ring 24 by screws 34 only one of which, however, appears. It will be apparent that when the lever is swung to the right in Fig. 2, the jaws 12 will be opened through the agency of the intermediate parts, while opposite motion of said lever will release the jaws so that they can be closed by the power of the spring 11.

It will be evident that I provide in effect two members and interposed friction means between the two and that one of these members turns with respect to the other. For instance, the ring 24 and disk 28 constitute together one of said members, while the other is composed of the band or sleeve 22 and the collar 30, the band 22 and collar 30 being turnable with respect to said ring 24 and disk 28. The frictional resistance exerted by the two washers 25 and 31 is greater than the force of the spring 11 so that when the projections 32 arrest the projections 21 in the manner already described, the jaws 12 will be fully opened, but when said jaws have been opened to their maximum extent and when the studs 14 have encountered the end walls of the cam slots 15, the sleeve 22 and collar 30 will slip on the leather washers 25 and 31 and therefore turn with respect to the ring 24 and disk 28, the jaws 12 remaining open. It will be understood that the instant the projections 32 are moved out of engagement with the projections 21, the jaws 12 will be closed by the spring 11.

What I claim is:

1. A work carrier comprising a driving member having teeth, a driven member having teeth loosely in mesh with the other teeth to permit radial movement in all directions of the driven member, and jaw mechanism connected with said driven member.

2. A work carrier comprising a driving member having internal teeth, a driven member having external teeth loosely in mesh with the other teeth to permit radial movement in all directions of said driven member, and jaw mechanism connected with said driven member.

3. A work carrier comprising a driving member having a center and internal teeth, a driven member inclosed by the driving member, provided with external teeth loosely in mesh with the internal teeth to permit radial movement in all directions of said driven member, and jaw mechanism carried by the driven member.

4. A work carrier comprising a driving member having internal teeth, an annular driven member having external teeth in loose mesh with the other teeth, and jaw mechanism on said driven member.

5. A work carrier comprising a rotary driving member, a member radially movable in all directions and driven by said driving member, jaws supported by said driven member, a device supported in coöperative relation and normally rotative with said driving member, means for arresting the motion of said device, and means for automatically operating said jaws by said device when the same is arrested.

6. A work carrier comprising a driving member, a floating member driven by said driving member, jaws supported by the floating member, and mechanism for automatically opening said jaws during the rotation of said driving member.

7. A work carrier comprising a driving member having a center, a floating member driven by said driving member, jaws supported by said driven member, and mechanism for automatically opening and closing said jaws during the rotation of said driving member.

8. A work carrier comprising a driving member, a driven member radially movable in all directions and driven by said driving member, a plurality of jaws supported by said driven member and symmetrically disposed with relation to the axis thereof, means for simultaneously operating said jaws, and supplementary jaws movably mounted on said first-mentioned jaws.

9. A work carrier comprising a rotary driving member, a floating member driven by said driving member, jaws supported by said driven member, a barrel inclosing the driving and driven members, a spring connected with the driven member and barrel, for operating the barrel relatively to said driven member, the barrel having cam means for opening the jaws, and means for arresting the motion of the barrel with the driving member whereby the cam means can open the jaws when the barrel is arrested said cam means on the release of said barrel causing the closing of the jaws.

10. A work carrier comprising a rotary driving member a floating member driven by said driving members, jaws supported by said driven member, a device normally rotative with said driving member, and means for arresting the motion of said device with relation to said driving member, said device having cam means for operating the jaws when said device is arrested.

11. A work carrier comprising a rotary driving member, a floating member driven by said driving member, jaws pivotally supported by said driven member and having projecting studs, a device normally rotative with the driving member, having cam slots to receive the respective studs, and means for arresting said device during the rotation of said driving member, the walls of said slots acting against said studs to open the jaws on the arresting of said device.

12. A work carrier comprising a rotary driving member, having internal teeth, a driven member having external teeth in mesh with the other teeth to permit radial movement in all directions of said driven member, jaws pivotally supported by said driven member, and a barrel inclosing the driving and driven members, normally rotative with said driving member and having cam slots, the jaws being provided with studs to enter said slots and the walls of said slots acting against said studs to open said jaws when the motion of the barrel with respect to the driving member is arrested.

13. A work carrier comprising a rotary driving member having internal teeth, a driven member provided with external teeth loosely in mesh with said other teeth to permit radial movement in all directions of the driven member, jaws pivotally supported by said driven member, provided with studs, a barrel surrounding the driving and driven members, having cam slots to receive said studs, and a coiled spring surrounding the driven member, connected therewith and with the barrel.

14. A work carrier comprising a rotary driving member, a member driven by said driving member, and radially movable in all directions, jaws carried by the driven member, and mechanism for automatically opening and closing said jaws during the rotation of said driving member.

15. A work carrier comprising a rotary driving member, a floating member driven by said driving member, pivotally mounted jaws supported by the driven member, mechanism for automatically opening and closing said jaws, and auxiliary jaws pivotally supported by the other jaws, provided with eccentric gripping portions.

16. A work carrier comprising a rotary driving member, provided with teeth, a driven member having teeth in mesh loosely with the other teeth to permit radial movement of the driven member in all directions, jaws pivotally supported by the driven member, means for opening and closing said jaws, and auxiliary jaws pivotally mounted on the other jaws and provided with eccentric gripping portions.

17. A work carrier comprising a driving member, a floating member driven by said driving member, jaws connected with said floating member, spring actuated means for normally closing the jaws, a device movable into position to open the jaws and a second device acting frictionally against the other device with a resistance exceeding that of the spring tending to close said jaws.

In testimony whereof I affix my signature in presence of two witnesses.

FRIEDERICH MÜLLER.

Witnesses:
E. W. F. NORDSTROM,
FRANK FREYBAL.